(12) United States Patent
Osad et al.

(10) Patent No.: US 12,326,332 B2
(45) Date of Patent: Jun. 10, 2025

(54) SYSTEMS, METHODS, AND DEVICES FOR MEASURING TEAR SEAM THICKNESSES OF BREAKAWAY PANELS FOR VEHICLE AIRBAGS

(71) Applicant: GM GLOBAL TECHNOLOGY OPERATIONS LLC, Detroit, MI (US)

(72) Inventors: William Osad, Macomb, MI (US); Michael P. Balogh, Novi, MI (US); Lane G. Lindstrom, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 516 days.

(21) Appl. No.: 17/847,820

(22) Filed: Jun. 23, 2022

(65) Prior Publication Data

US 2023/0417527 A1 Dec. 28, 2023

(51) Int. Cl.
*G01B 3/24* (2006.01)
*B60R 21/2342* (2011.01)

(52) U.S. Cl.
CPC ............ *G01B 3/24* (2013.01); *B60R 21/2342* (2013.01)

(58) Field of Classification Search
CPC .......... G01B 3/24; G01B 5/0025; G01B 5/06; B60R 21/2342
See application file for complete search history.

(56) References Cited

U.S. PATENT DOCUMENTS

| | | | | |
|---|---|---|---|---|
| 898,565 A | * | 9/1908 | Duncan | G01B 3/166 33/679.1 |
| 1,152,191 A | * | 8/1915 | Lockhart | G01B 3/16 33/558.06 |
| 1,790,989 A | * | 2/1931 | Larson | G01B 3/166 33/798 |
| 4,233,743 A | * | 11/1980 | Flick | G01B 3/20 600/587 |
| 4,567,436 A | * | 1/1986 | Koch | B82Y 15/00 33/DIG. 1 |
| 7,475,493 B2 | * | 1/2009 | Haglof | G01B 3/20 33/783 |
| 7,594,674 B1 | | 9/2009 | Biondo et al. | |

(Continued)

FOREIGN PATENT DOCUMENTS

| | | |
|---|---|---|
| CN | 2718512 Y | 8/2005 |
| CN | 204788176 U | 11/2015 |

(Continued)

*Primary Examiner* — Yaritza Guadalupe-Mccall
(74) *Attorney, Agent, or Firm* — Quinn IP Law (57) ABSTRACT

Presented are devices for measuring dimensions of tear seams, methods for making/using such devices, and hand-held clamp calipers for gauging material thicknesses of tear seams in passenger airbag breakaway panels. A handheld or automated measurement tool for determining seam dimensions includes first and second jaws operatively attached to a calibrated scale. The calibrated scale displays a measurement value for a dimension of a seam. The first jaw includes a first jaw tip projecting from a first jaw mandible. The second jaw includes a second jaw tip projecting from a second jaw mandible, which is movably attached with the first jaw mandible. Each of the jaw tips contacts a respective surface of the seam. An interior edge of the second jaw tip is disposed at an oblique angle of less than 90 degrees from an interior edge of the second jaw mandible.

20 Claims, 3 Drawing Sheets

(56) References Cited

U.S. PATENT DOCUMENTS

| | | | |
|---|---|---|---|
| 7,690,723 B2 | 4/2010 | Evans et al. | |
| 7,748,732 B2 | 7/2010 | Sella et al. | |
| 7,810,837 B2 | 10/2010 | Thomas et al. | |
| 7,862,081 B2 | 1/2011 | Thomas | |
| 7,905,514 B2 | 3/2011 | Thomas | |
| 8,826,557 B2 * | 9/2014 | Yang | G01B 3/20 33/808 |
| 10,960,843 B2 | 3/2021 | Esparza | |
| 11,624,601 B1 * | 4/2023 | Babitchenko | G01B 3/18 33/813 |
| 2003/0233761 A1 * | 12/2003 | Erskine-Smith | A61C 19/04 33/513 |
| 2014/0007445 A1 * | 1/2014 | Yang | G01B 3/20 33/811 |
| 2015/0096184 A1 * | 4/2015 | Polishchuk | G01B 21/08 33/549 |
| 2023/0417527 A1 * | 12/2023 | Osad | G01B 3/24 |
| 2024/0060764 A1 * | 2/2024 | Brodie | G01B 3/20 |

FOREIGN PATENT DOCUMENTS

| | | | |
|---|---|---|---|
| CN | 208269764 U | * | 12/2018 |
| CS | 219059 B1 | * | 2/1983 |
| DE | 823658 B | | 12/1951 |

\* cited by examiner

SYSTEMS, METHODS, AND DEVICES FOR MEASURING TEAR SEAM THICKNESSES OF BREAKAWAY PANELS FOR VEHICLE AIRBAGS

INTRODUCTION

The present disclosure relates generally to occupant restraint systems for motorized vehicles. More specifically, aspects of this disclosure relate to systems, methods and devices for measuring tear seam thicknesses of breakaway panels for vehicle airbags.

Current production motor vehicles, such as modern-day automobiles, are originally equipped with an assortment of occupant restraint systems for limiting the inadvertent movement of a driver or passenger that may result from an abrupt vehicle stop, vehicle inversion, or sudden impact with a foreign object. In automotive applications, for example, the most recognizable type of occupant restraint system is the passenger seatbelt assembly. Most vehicle seatbelt assemblies are strap-and-latch type chest harnesses designed to retain passenger compartment occupants in their seat and provide controlled deceleration of the occupant to limit the application of external forces to the occupant's body during rapid deceleration. A typical seatbelt assembly employs a belt buckle, which is usually located inboard from the occupant seating position, for engagement with a mating latch plate, generally provided outboard from the occupant seating position. Mating of the latch plate with the belt buckle positions a multipoint belt strap across the chest of a seated occupant for restraining the occupant against abrupt movement from the seat.

Many automobiles, as part of an overall occupant restraint system, employ a supplemental inflatable restraint (SIR) system with inflatable airbags to attenuate occupant kinetic energy and reduce involuntary occupant contact with interior structures of the vehicle. A standard airbag device includes an inflatable airbag module that is mounted to a steering wheel hub (e.g., for driver-side airbags), behind a vehicle instrument panel (e.g., for passenger-side airbags), or inside a vehicle seat assembly, side door trim, or headliner trim (e.g., for side-impact airbags). A distributed array of dynamic sensors is strategically located throughout the vehicle to detect the onset of any one of multiple SIR triggering events. A resident sensing and diagnostic module (SDM) responsively activates an inflation device, internally located in the airbag module, to produce a flow of inflating gas into an inflatable airbag cushion, also located within the module. The inflating gas causes the airbag cushion to deploy into the vehicle passenger compartment, toward the occupant.

For day-to-day operation of an automobile, each airbag module may be housed behind a breakaway panel or similarly suitable trim structure to protect the module when in an undeployed state and to provide an aesthetically appealing A-surface for the interior of the passenger cabin. The breakaway panel covers the occupant-facing sections of the airbag cushion and may help to hold it in a constrained and folded state. Upon activation of the airbag module, the breakaway panel is designed to open or otherwise provide an unimpeded pathway through which the airbag cushion rapidly inflates and expands towards an occupant. Many conventional airbag covers are fabricated with a pattern of frangible tear seams to facilitate proper inflation of the airbag cushion. Airbag module deployment is achieved by the rapid injection of a pyrotechnic gas into the airbag cushion; the rapidly expanding cushion, in turn, strikes the juxtaposed face of the breakaway panel, causing the tear seam(s) to rupture or rip. These tear seams are therefore designed to provide sufficient structural integrity for mounting the breakaway panel and airbag module during vehicle assembly while sufficiently weakening the panel for unimpeded airbag deployment.

SUMMARY

Presented herein are measurement devices for determining dimensions of seams, methods for manufacturing and methods for operating such devices, and handheld measurement instruments for gauging seam thicknesses of tear seams in breakaway panels of vehicle airbags. By way of example, and not limitation, there are disclosed systems, methods, and devices for measuring a material thickness of a tear seam in a passenger airbag (PAB) chute or similar breakaway structure to ensure successful airbag operation. Accurate measurement of a tear seam thickness is often complicated by the easily distortable materials, irregular geometries, and narrow dimensions of many tear seams. To address these constraints, a handheld clamp-type caliper employs a specialized jaw design to accurately measure very fine tear seams, e.g., with thicknesses as small as about 0.01 mm, having irregular geometries, e.g., with asymmetrical cross-sections, without puncturing or compromising the seam. The clamp caliper may be designed with an easy-to-read gauge, a low spring force return spring, interchangeable, pivotable, and/or slidable jaws, etc. Disclosed caliper tool designs may be used for part validation during preproduction approval process (PPAP) and for quality assurance in production settings.

Aspects of this disclosure are directed to devices for measuring dimensions of seams, such as a material thickness of a tear seam in a PAB chute or like breakaway panel structure of a motor vehicle. As used herein, the terms "vehicle" and "motor vehicle" may be used interchangeably and synonymously to include any relevant vehicle platform, such as passenger vehicles (ICE, HEV, FEV, fuel cell, etc.), commercial vehicles, industrial vehicles, tracked vehicles, all-terrain vehicles (ATV), motorcycles, watercraft, aircraft, etc. Moreover, disclosed concepts are similarly applicable to vehicular and non-vehicular applications alike. In an example, a handheld or automated measurement tool is presented for determining dimensions of seams. The measurement tool includes a pair of opposing (first and second) jaws and a calibrated scale, which displays a measurement value (e.g., metric or imperial scale) for a dimension (e.g., width, height, length, etc.) of a seam being measured. Each jaw includes a respective jaw mandible with a jaw tip projecting from the mandible. The jaw tips are each designed to contact, e.g., without puncturing or damaging, a respective surface of the seam. The mandibles are movably attached to each other and slide across, press against, or otherwise operatively attach to the calibrated scale. The interior edge of at least one of the jaw tips is disposed at an oblique angle of less than 90 degrees from a juxtaposed interior edge of its mating jaw mandible, e.g., such that the tip does not contact a normal vertical face of the workpiece adjoining the seam.

Additional aspects of this disclosure are directed to methods for making and methods for using any of the herein described measurement systems and devices. In an example, a method is presented for assembling a measurement tool for determining a dimension of a seam. This representative method includes, in any order and in any combination with any of the above and below disclosed options and features:

fabricating, assembling, accepting, or retrieving (collectively "receiving") a calibrated scale configured to display a measurement value for the dimension of the seam; receiving a first jaw including a first jaw mandible and a first jaw tip projecting from the first jaw mandible, the first jaw tip being configured to contact a first surface of the seam; slidably, abuttingly, or otherwise operatively attaching the first jaw mandible to the calibrated scale; receiving a second jaw including a second jaw mandible and a second jaw tip projecting from the second jaw mandible, the second jaw tip configured to contact a second surface of the seam opposite the first seam surface, wherein an interior tip edge of the second jaw tip is disposed at an oblique angle of less than 90 degrees from a juxtaposed interior mandible edge of the second jaw mandible; slidably, abuttingly, or otherwise operatively attaching the second jaw mandible to the calibrated scale; and slidably, rotatably, or otherwise movably attaching the second jaw mandible with the first jaw mandible.

For any of the disclosed systems, methods, and devices, the mating jaws may be structurally similar with each other or, alternatively, may be structurally distinct from each other. For instance, the tip of the first jaw may have an isosceles triangle shape whereas the tip of the second jaw may have an isosceles triangle shape or, for at least some configurations, a scalene triangle shape. Moreover, the length of the mandible of the first jaw may be the same as or less than the length of the mandible of the second jaw. For at least some configurations, each jaw further includes a tooth section that is interposed between and connects the jaw's tip to the jaw's mandible. The tooth section may project substantially orthogonally from the jaw mandible. Moreover, the tooth section may be integrally formed with the jaw tip and at least a portion of the jaw mandible.

For any of the disclosed systems, methods, and devices, the oblique angle at which the interior edge of the jaw tip is angled from the interior edge of the jaw mandible is at least about 65 degrees or, for some configurations, about 70 degrees to about 85 degrees. As yet a further option, an exterior edge of the jaw tip is opposite to and angled from the interior tip edge by at least about 20 degrees or, for some configurations, about 25 degrees to about 40 degrees. It may be desirable that the collective length of the tooth and tip be at least about 30 millimeters (mm) or, for some configurations, about 45 mm to about 55 mm. It may also be desirable that a length of each mandible be at least two (2×) to three (3×) times as long as a collective length of its mating tooth and tip.

For any of the disclosed systems, methods, and devices, each jaw—the mandible, tooth, and tip—may be fabricated as a single-piece, unitary structure from a substantially rigid metallic or polymeric material. Moreover, the tip of each jaw may project substantially orthogonally from its mating mandible or may project at an oblique angle from the mandible. On the other hand, each jaw may be fabricated as a multi-piece assembly with the jaw tip removably, pivotably, and/or slidably mounted to its mating jaw mandible. As yet a further option, the vertex at which each jaw tip contacts a seam surface may be rounded or truncated or surface treated to ensure that the tip does not damage the seam.

For any of the disclosed systems, methods, and devices, the measurement tool may be a manually operated handheld device with a handle to which are mounted the calibrated scale and the two jaws. Alternatively, the measurement tool may be a controller-automated device, e.g., disposed at the end of a robotic end effector. In a similar regard, the calibrated scale may include a graduated slide rule, a mechanical dial gauge, and/or an electronic display gauge. As yet a further option, the measurement tool may take on a clamp-type caliper configuration in which a proximal connecting end of the first jaw mandible is rotatably mounted to a proximal connecting end of the second jaw mandible. In this instance, the jaw mandibles may be substantially parallel, the jaw teeth may be substantially parallel, and the jaw tips may point to each other when the jaws are closed. A biasing member, such as a helical or torsional return spring, may extend between and bias closed the two jaws.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Figure 1:
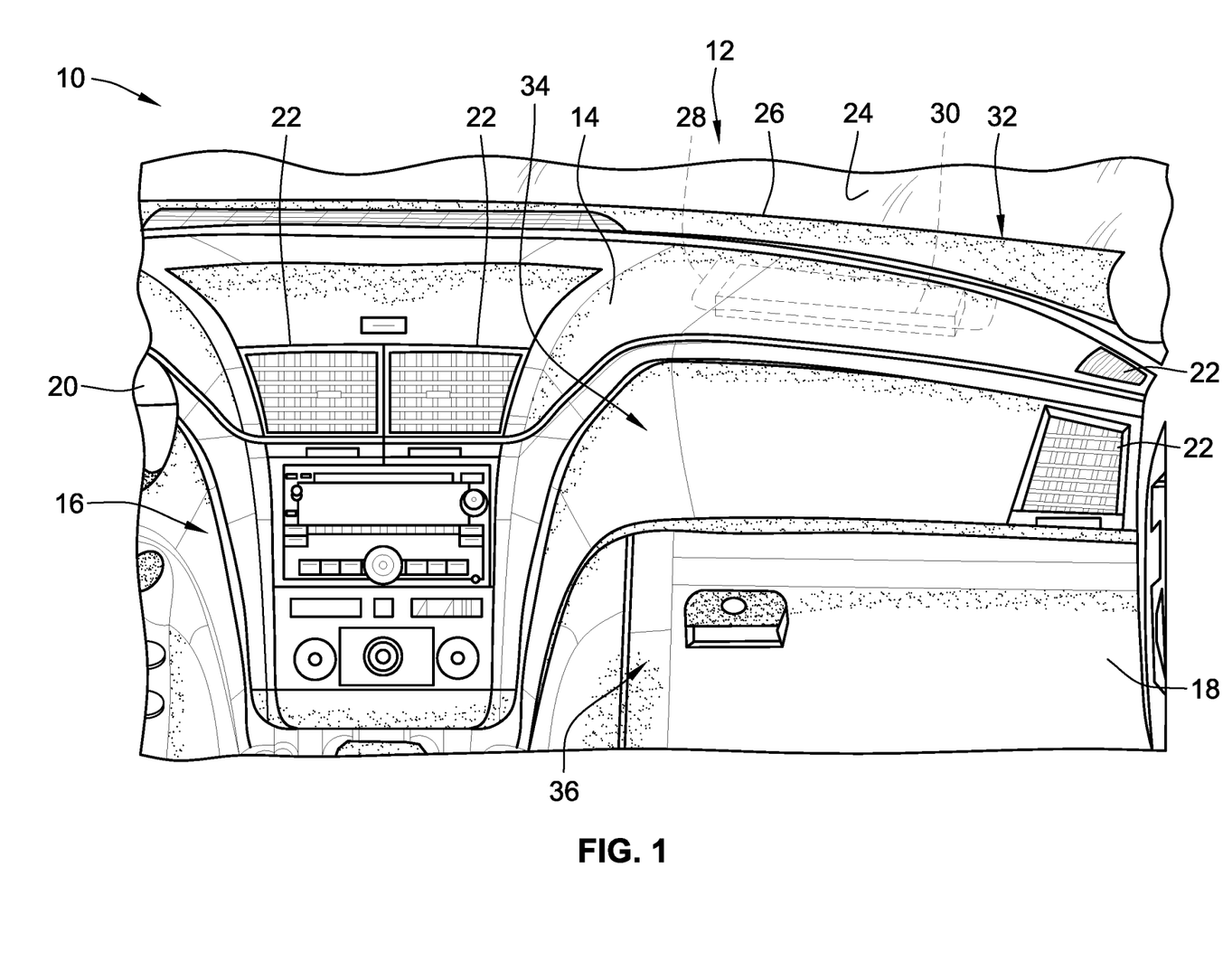
FIG. 1 is a forward-facing, perspective-view illustration inside of a passenger compartment of a representative motor vehicle showing a vehicle instrument panel with a top-mount breakaway panel for a SIR system airbag module in accord with aspects of the disclosed concepts.

Referring now to the drawings, wherein like reference numbers refer to like features throughout the several views, there is shown in FIG. 1 a forward portion inside of a passenger cabin of a representative automobile, which is designated generally at 10 and portrayed herein for purposes of discussion as a sedan-style passenger vehicle. The illustrated automobile 10—also referred to herein as "motor vehicle" or "vehicle" for short—is merely an exemplary application with which novel aspects of this disclosure may be practiced. In the same vein, utilization of the present concepts for measuring tear seams of PAB chutes for passenger-side airbag assemblies should be appreciated as a non-limiting implementation of disclosed features. As such, it will be understood that aspects and features of this disclosure may be used for measuring other airbag configurations and components, employed for any logically relevant type of motor vehicle, and utilized for both vehicular and non-vehicular applications alike. Moreover, only select components of the motor vehicles, SIR systems, and measurement devices are shown and described in additional detail herein. Nevertheless, the vehicles, systems, and devices discussed below may include numerous additional and alternative features, and other available peripheral components, for carrying out the various methods and functions of this disclosure.

Automobile 10 of FIG. 1 includes multiple interior compartments, such as a passenger cabin 12 for seating therein and physically separating vehicle occupants from the motor/engine bay and trunk. The passenger cabin 12 may take on any suitable layout having attendant vehicle interior structure, which is represented collectively in the drawings by an instrument panel 14 (also known as a "dashboard" or "IP fascia"), a center console 16, and a glove box 18. The instrument panel 14 extends transversely across the vehicle 10, at a forward end of the passenger compartment 12. The instrument panel 14 houses various switches, accessories, and instrumentation, including, for example at the driver side, an electronic instrument cluster 20 with various digital or analog gauges, such as a speedometer, odometer, and tachometer (none of which are visible in the drawings). At the front passenger side, the instrument panel 14 houses, among other things, the glove box 18 and assorted heating, ventilation, and air conditioning (HVAC) vents 22. The center console 16, which is shown housing a telematics unit, button panel, and audio system head unit, originates at the instrument panel 14 and extends rearward in the passenger cabin 12 between front driver and passenger seat assemblies (not shown). A front windshield 24 extends crosswise along the forward most portion of the passenger compartment 12, intersecting a complementary forward edge 26 of the instrument panel 14.

With continuing reference to FIG. 1, the instrument panel 14 may be delineated into upper, middle, and lower portions, indicated respectively by reference numerals 32, 34 and 36. As shown, the upper and lower portions 32, 36 extend in a generally rearward direction, from front to back of the vehicle 10, with the middle portion 34 extending therebetween in a generally vertical orientation, slightly angled or sloped in a forward direction. The instrument panel 14 is designed to cover and conceal various underlying components when installed in the automobile 10. For instance, the IP fascia 14 overlies a network of HVAC ducts (not shown), assorted cable harnesses (not shown), and some constituent parts of a vehicle supplemental inflatable restraint (SIR) system, such as a passenger-side airbag module, shown hidden at 30. With regard to the latter, the instrument panel 14 defines an internal cavity with a deployment door 28 that is formed through the IP's upper portion 32, facing in a generally upward direction relative to the vehicle 10. As will be explained in detail below, the deployment door 28 segment of the IP fascia 14 is provided, at least in part, by a tear seam in a breakaway panel segment of the fascia 14.

Figure 2:
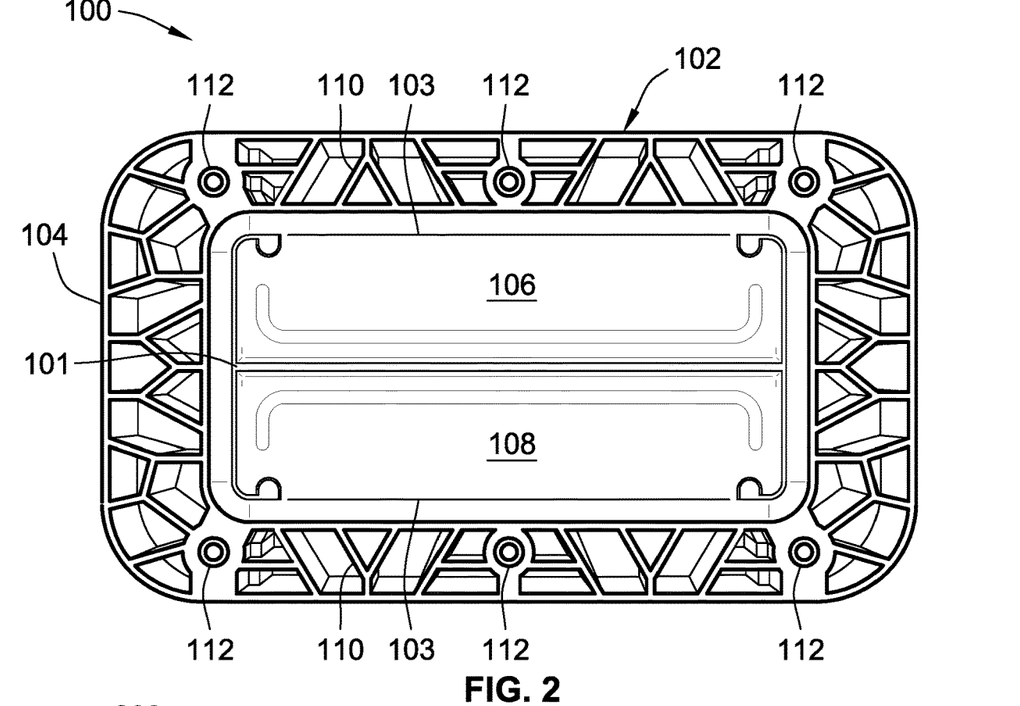
FIG. 2 is a plan-view illustration of a rear face of a representative PAB chute with an engineered network of tear seams in accord with aspects of the disclosed concepts.

Turning next to FIG. 2, there is shown a rear face of an illustrative PAB chute 100 with an engineered network of tear seams 101 that is made to fail or rupture upon inflation of an airbag cushion (e.g., within passenger-side airbag module 30 of FIG. 1). The illustrated PAB chute 100 may be injection-molded as a discrete single-piece structure, e.g., from an appropriate polymeric material, and may be mounted, e.g., via heat stakes, polymer welding, fasteners, etc., to an underside surface of the IP fascia 14, such that the chute 100 and fascia 14 collectively define a breakaway panel for the vehicle SIR system. It is also within the scope of this disclosure to integrally form the PAB chute 100 with the IP fascia 14 or mount/form the chute 100 at other locations within the passenger cabin 12 for use with other airbag modules of the SIR system. To this end, disclosed concepts are similarly applicable to seams and other structural interfaces of different breakaway panel configurations and other components in both vehicular and non-vehicular applications.

PAB chute 100 of FIG. 2 is fabricated with a main chute body 102 that may be delineated into a load-bearing mounting frame 104 that partially or fully circumscribes a central chute door. The chute door may be typified by a solitary door panel or, if desired, multiple door panels, such as the two juxtaposed (first and second) door panels 106 and 108 depicted in FIG. 2. The mounting frame 104 includes an interconnected set of reinforcement ribs 110 for structurally strengthening the chute 100, e.g., during assembly into and use in a vehicle. A rectangular array of fastener holes 112 is spaced around the mounting frame 104 for receiving bolts, studs, screws, etc., that rigidly mount a PAB module to the chute 100. It is envisioned that the PAB chute 100 may take on any desired shape, size, and manner of chute-to-module attachment without departing from the intended scope of this disclosure.

The tear seams 101 of FIG. 2 demarcate interfacing edges of the door panels 106, 108 at which these panels 106, 108 adjoin with and, when desired, separate from each other and from the mounting frame 104. At the same time, a distal edge 103 of each door panel 106, 108 may lack a tear seam such that, upon deployment of the airbag cushion and concomitant tearing the seams 101, these seam-free edges 103 function as flexible pivot joints around which rotate the door panels 106, 108. Each seam within the network of tear seams 101 of FIG. 2 may be created by forming or machining a reduced-thickness channel in a rear face of the PAB chute 100. According to the illustrated example, the tear seams 101 are arraigned in an I-shaped pattern with left and right round-tipped rectilinear bars that are orthogonally oriented with and extend transversely from opposing longitudinal ends of a rectilinear central stem. With that said, the tear seam network may take on alternative engineered patterns to accommodate different types, sizes, and locations of deployable airbags.

Figure 3:
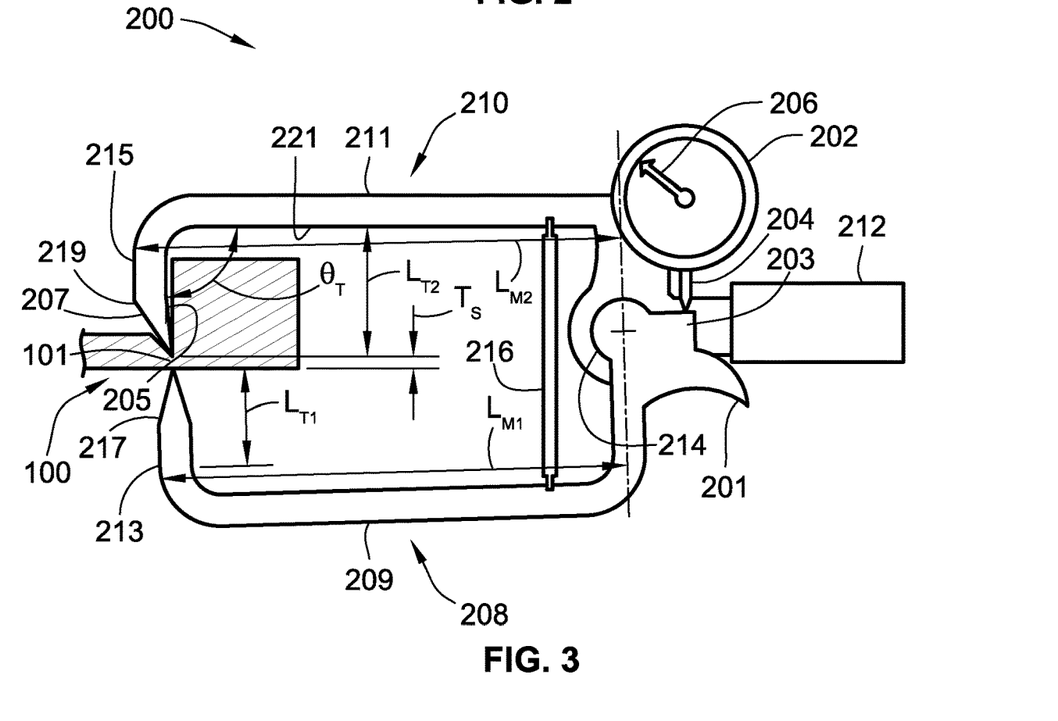
FIG. 3 is a side-view illustration of a representative handheld measurement tool with a hook-angled jaw having an engineered tooth tip design for determining a dimension of a tear seam in accord with aspects of the disclosed concepts.
Figure 4:
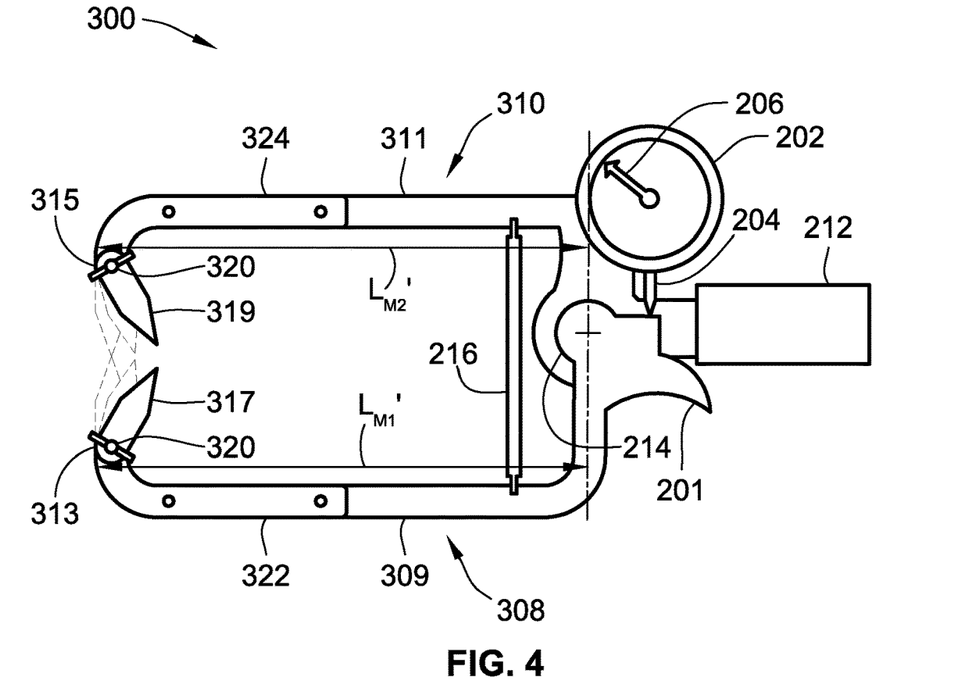
FIG. 4 is a side-view illustration of a representative handheld measurement tool with interchangeable and pivotable jaw tips for determining a dimension of a tear seam in accord with aspects of the disclosed concepts.
Figure 5:
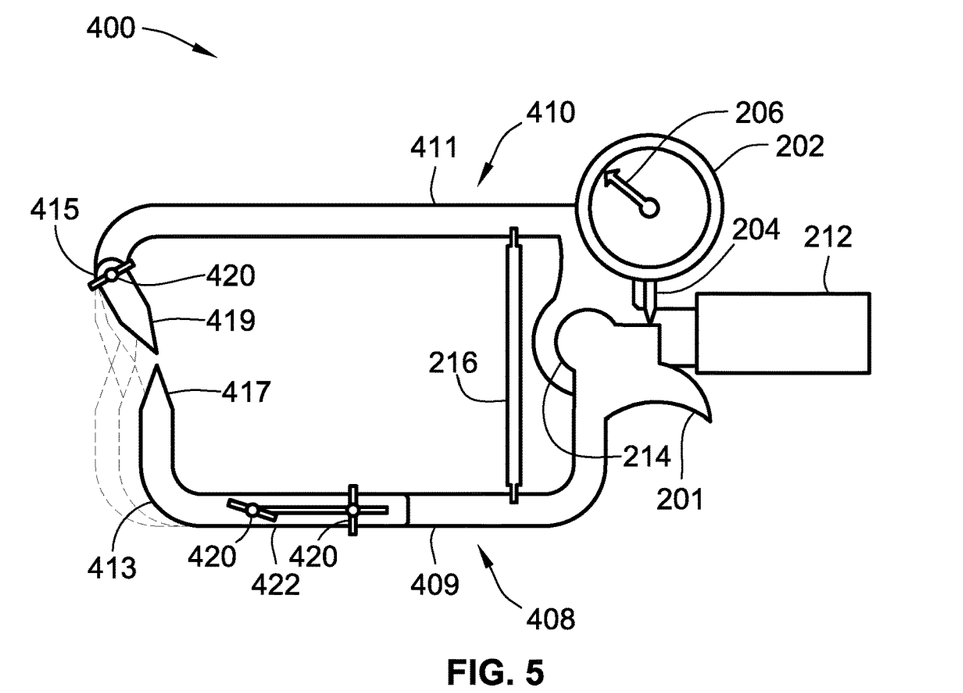
FIG. 5 is a side-view illustration of a representative handheld measurement tool with slidable and pivotable jaw tips for determining a dimension of a tear seam in accord with aspects of the disclosed concepts.

Presented in FIGS. 3-5 are assorted examples of measurement tools, respectively designated 200, 300 and 400, that can be implemented for determining one or more desired dimensions of a seam or select structural feature. Although differing in appearance, it is envisioned that any of the features and options described below with reference to the measurement tool 200 of FIG. 3 may be incorporated, singly or in any combination, into the measurement tools 300 and 400 of FIGS. 4 and 5, and vice versa. For instance, all three of the illustrated measurement tools 200, 300, 400 are depicted as handheld, manually operated devices; however, each measurement tool may be adapted into a controller-automated electronic device, e.g., that is disposed at the end of a robotic end effector or a tool head of a numerically controlled (NC) machine. As another non-limiting point of similarity, all three measurement tools 200, 300, 400 are depicted and described as clamp-type "outside" caliper gauges; nevertheless, each tool may take on alternative constructions, including slide-type calipers, C and F-type power screw calipers, inside calipers, digital calipers, etc. For purposes of efficiency and brevity, like reference numbers will be used to designate and describe like components in FIGS. 3-5.

All three representative measurement tools 200, 300, 400 (also referred to herein as "measurement device" or "caliper") employ a calibrated scale 202 that presents a measurement value for a desired dimension of a structural feature being measured. As shown, the calibrated scale 202 is a mechanical dial gauge with a spring-loaded lift lever 204 that is drivingly connected via internal gear train (not shown) to a rotating dial hand 206. Rectilinear translation of the lift lever 204 causes the dial hand 206 to rotate along a circumferentially spaced graduated scale to display measurement values (e.g., metric, imperial, primary/secondary/working, etc.) for a dimension (e.g., width, height, length, etc.) of a seam, such a tear seam thickness $T_S$ of tear seam 101. Alternatively, the calibrated scale 202 may take on additional and alternative forms, including graduated slide rules, Vernier scales, electro-mechanical analog gauges, electronic digital gauges, etc. It may be desirable that the dial indicator of the calibrated scale 202 exhibit a resolution of 0.01 mm or better; however, different metric and/or imperial graduation scales may be employed.

For clamp-type caliper gauge designs, the measurement tool 200, 300, 400 is assembled with a respective lower (first) jaw 208, 308 and 408 that selectively rotates towards and away from a respective upper (second) jaw 210, 310, and 410 in a scissor-like fashion. By way of non-limiting example, each jaw 208, 210 of FIG. 3 is shown with a C-shaped construction defined by an elongated and bow-shaped mandible 209 and 211, respectively, with a respective jaw tooth 213 and 215 and integral tooth tip 217 and 219 projecting from a distal (leftmost) end of each mandible 209, 211. The tooth 213, 215 of each jaw 208, 210 may be rectilinear and may project substantially orthogonally from its mating mandible 209, 211, whereas each tip 217, 219 may project at a right angle (e.g., tip 217) or an oblique angle (e.g., tip 219) with respect to its buttressing mandible 209, 211. As shown, the tooth 213, 215 sections are interposed between and connect the tips 217, 219 to their respective mandible 209, 211. Opposing distal and/or proximal ends of the mandibles 209, 211 may be arcuate. Each jaw 208, 210, including its mandible 209, 211, tooth 213, 215, and tip 217, 219, may be fabricated as a single-piece, unitary structure from a substantially rigid metallic material (e.g., stainless steel alloys) or polymeric material (e.g., high-impact polyvinyl chloride (PVC)). Recognizably, the shapes and sizes of a tool's jaws may be varied, singly and collectively, from that which are shown in the drawings to accommodate a variety of different intended applications.

Continuing with the discussion of clamp-type caliper gauges, the mandibles 209, 211 are movably attached together such that the lower and upper jaws 208, 210 may be selectively transitioned towards and away from each other. In accord with the illustrated example, a proximal (rightmost) connecting end of the lower jaw mandible 208 is rotatably mounted, e.g., via a pivot joint 214, to a proximal connecting end of the upper jaw mandible 210. The pivot joint 214 may take on any suitable mechanical connection that allows for controlled rotation of one or both jaws, such as radial bearings, pivot pin couplings, rivet joints, etc. For manually operated handheld devices, the calibrated scale 202 and the two jaws 208, 210 may be supported on a gripping handle 212. Specifically, the proximal (rightmost) end of the upper jaw 210 is shown cantilevered to the handle 212, with the calibrated scale 202 rigidly mounted to the upper jaw 210 above the pivot joint 214 and the lower jaw 208 pivotably mounted to the upper jaw 210 adjacent the handle 212.

With the foregoing arrangement, a user may hold the gripping handle 212 with one hand, and effect rotation of the lower jaw 208 away from the upper jaw 210 (e.g., in a counterclockwise direction in FIG. 3) by pressing a finger trigger 201 adjacent the handle 212. After opening the throat of the caliper 200, the user may pass the jaws 208, 210 over opposing sides of the workpiece (e.g., forward and rearward faces of PAB chute 100) and align the jaw tips 217, 219 with the structure being evaluated (e.g., tear seam 101). A biasing member 216, such as a torsional spring, leaf spring, helical return spring, etc., may extend between and bias closed the two jaws 208, 210. When the throat of the caliper 200 is drawn closed, the lower jaw tip 217 presses up against a lower (first) surface of the seam 101 while the upper jaw tip 219 presses down against an upper (second) surface of the seam 101 on the side opposite that of the seam's lower surface. When the jaws 208, 210 are fully closed, sans workpiece, the jaw mandibles 209, 211 may be substantially parallel to each other, the jaw teeth 213, 215 may be substantially parallel to each other, and the jaw tips 217, 219 may point to each other.

Both jaw mandibles 209, 211 are operatively attached to the calibrated scale 202 such that rotation of the lower and upper jaws 208, 210 away from each other concomitantly effects a corresponding readout from the calibrated scale 202. When embodied as a mechanical dial gauge, for example, the calibrated scale 202 may be rigidly mounted to one of the jaws (e.g., upper jaw 210 in FIG. 3) with the lift lever 204 abutting the other one of the jaws (e.g., lower jaw 208). It should be appreciated that the scale 202 may be rigidly mounted to the other jaw (e.g., lower jaw 208) or, if desired, to the handle 212. A user pressing on the finger trigger 201 causes the distal end of the lower jaw 208 to rotate downward and away from the distal end of the upper jaw 210, and also causes the proximal end of the lower jaw 208 to rotate upward and towards the calibrated scale 202. In so doing, a landing shelf 203, which is integral with finger trigger 201 and located underneath the scale 202 at the proximal end of the jaw 208, presses against the lift lever 204 and thereby rotates the dial hand 206.

It may be desirable that the mating jaws of a measurement tool be structurally similar with each other, as shown for example in FIG. 4, or may be structurally distinct from each other, as shown for example in FIGS. 3 and 5. For instance, the jaw tip 217 of the lower jaw 208 in FIG. 3 may have one geometry (e.g., an isosceles triangle shape), whereas the jaw tip 219 of the upper jaw 210 may have a different geometry (e.g., a scalene triangle shape). Alternatively, both jaw tips 317, 319, 417, 419 of both the lower and upper jaws 308, 310, 408, 410 in FIGS. 4 and 5 may share a common geometry (e.g., an isosceles triangle shape). It is also within the scope of this disclosure that the jaw tips take on other regular and irregular geometric shapes of similar or distinct sizes. As yet a further option, the contact point at which a jaw tip presses against a seam surface may be rounded, truncated, coated, surface treated, etc., to ensure that the tip does not damage the seam during measurement thereof.

Continuing with the preceding discussion, the dimensions of the mating jaws of a measurement tool may be substantially similar with each other or, alternatively, may be distinct from each other. By way of example, and not limitation, a lower (first) mandible length $L_{M1}$ of the lower jaw mandible 209 in FIG. 3 may be less than an upper (second) mandible length $L_{M2}$ of the upper jaw mandible 211 such that the upper jaw 210 is longer than the lower jaw 208. Alternatively, a lower (first) mandible length $L_{M1}'$ of the lower jaw mandible 309 in FIG. 4 may be approximately equal to an upper (second) mandible length $L_{M2}'$ of the upper jaw mandible 311. In another non-limiting example, a (first) total tooth length $L_{T1}$ of the jaw tooth 213 and tip 217 of the lower jaw 208 in FIG. 3 may be less than a (second) total tooth length $L_{T2}$ of the jaw tooth 215 and tip 219 of the upper jaw 208. Conversely, the opposing jaws 308, 310 of FIG. 4 share a common total tooth length.

To accommodate the varying geometries, locations, and surrounding features of the workpiece segments being measured, one or both measurement tool jaws may be structurally engineered to gauge an assortment of dimensions for a countless number of innately distinct workpiece features. In the example of FIG. 3, an interior tip edge 205 of the upper jaw tip 219 is disposed at an oblique tip angle $\theta_T$ of less than 90 degrees from an interior mandible edge 221 of the upper mandible 211, e.g., such that the tip 219 does not contact the normal vertical face of the PAB chute 100 adjoining the seam 101. The tip angle $\theta_T$ may be at least about 65 degrees or, for some configurations, about 70 degrees to about 85 degrees. As yet a further option, an exterior edge 207 of the jaw tip 219, opposite to the interior tip edge 205, is angled from the tip edge 205 by at least about 20 degrees or, for some configurations, about 25 degrees to about 40 degrees. It may be desirable that the collective length $L_{T2}$ of the tooth 215 and tip 219 be at least about 30 millimeters (mm) or, for some configurations, about 45 mm to about 55 mm. It may also be desirable that a length $L_{M1}$ and $L_{M2}$ of each mandible 209, 211 be at least two (2×) to three (3×) times as long as a total tip length of its mating tooth 213, 215 and tip 217, 219.

Turning next to FIGS. 4 and 5, there are shown examples of multipiece measurement tool jaws with movable and interchangeable jaw teeth and tips. In FIG. 4, for example, the jaw teeth 313, 315 and tips 317, 319 are selectively rotatable, e.g., in both clockwise and counterclockwise directions via mating t-nuts and bolts (collectively designated 320), with respect to their mating mandibles 309, 311. As yet another option, the jaw teeth 313, 315 and tips 317, 319 may be integrated into interchangeable tool heads 322 and 324, respectively, that may be selectively removed from the mandibles 319, 311 and, if desired, replaced with other complementary tool heads. By comparison, the jaw tooth 413 and tip 417 of the lower jaw 408 are slidably mounted onto the jaw mandible 409 to move in a rectilinear motion (e.g., left and right in FIG. 5), whereas the jaw tooth 415 and tip 419 of the upper jaw 410 are pivotably mounted onto the jaw mandible 411 to rotate in a circular motion (e.g., clockwise and counterclockwise in FIG. 5).

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A measurement tool for determining a dimension of a seam, the seam having opposing first and second surfaces, the measurement tool comprising:
   a calibrated scale configured to display a measurement value for the dimension of the seam;
   a first jaw including a first jaw mandible and a first jaw tip projecting from the first jaw mandible, the first jaw mandible being operatively attached to the calibrated scale, and the first jaw tip being configured to contact the first surface of the seam; and
   a second jaw including a second jaw mandible and a second jaw tip projecting from the second jaw mandible, the second jaw mandible being operatively attached to the calibrated scale and movably attached with the first jaw mandible, and the second jaw tip configured to contact the second surface of the seam, wherein an interior tip edge of the second jaw tip is disposed at an oblique angle of less than 90 degrees from an interior mandible edge of the second jaw mandible.

2. The measurement tool of claim 1, wherein the second jaw tip has a scalene triangle shape.

3. The measurement tool of claim 2, wherein the first jaw tip has an isosceles triangle shape.

4. The measurement tool of claim 1, wherein the first jaw mandible has a first length and the second jaw mandible has a second length longer than the first length.

5. The measurement tool of claim 1, wherein the second jaw further includes a second tooth interposed between and connecting the second jaw tip and the second jaw mandible, the second tooth projecting substantially orthogonally from the second jaw mandible.

6. The measurement tool of claim 5, wherein the first jaw further includes a first tooth interposed between and connecting the first jaw tip and the first jaw mandible, the first tooth projecting substantially orthogonally from the first jaw mandible.

7. The measurement tool of claim 1, wherein the oblique angle at which the interior tip edge of the second jaw tip is angled from the interior mandible edge of the second jaw mandible is about 70 degrees to about 85 degrees.

8. The measurement tool of claim 1, wherein an exterior tip edge of the second jaw tip is opposite to and angled from the interior tip edge by about 25 degrees to about 40 degrees.

9. The measurement tool of claim 1, wherein the second jaw is a multipiece structure with the second jaw tip pivotably and/or slidably mounted to the second jaw mandible.

10. The measurement tool of claim 1, wherein the second jaw is a multipiece structure with the second jaw tip removably mounted to the second jaw mandible.

11. The measurement tool of claim 1, wherein the first jaw is a single-piece structure with the first jaw tip projecting substantially orthogonally from the first jaw mandible.

12. The measurement tool of claim 1, further comprising a handle to which are mounted the calibrated scale, the first jaw, and the second jaw.

13. The measurement tool of claim 1, wherein a first connecting end of the first jaw mandible is rotatably mounted to a second connecting end of the second jaw mandible.

14. The measurement tool of claim 1, wherein the calibrated scale includes a mechanical dial gauge or an electronic display gauge.

15. A method of assembling a measurement tool for determining a dimension of a seam, the seam having opposing first and second surfaces, the method comprising:
receiving a calibrated scale configured to display a measurement value for the dimension of the seam;
receiving a first jaw including a first jaw mandible and a first jaw tip projecting from the first jaw mandible, the first jaw tip being configured to contact the first surface of the seam;
operatively attaching the first jaw mandible to the calibrated scale;
receiving a second jaw including a second jaw mandible and a second jaw tip projecting from the second jaw mandible, the second jaw tip configured to contact the second surface of the seam, wherein an interior tip edge of the second jaw tip is disposed at an oblique angle of less than 90 degrees from an interior mandible edge of the second jaw mandible;
operatively attaching the second jaw mandible to the calibrated scale; and
movably attaching the second jaw mandible with the first jaw mandible.

16. The method of claim 15, wherein the first jaw tip has an isosceles triangle shape and the second jaw tip has a scalene triangle shape.

17. The method of claim 15, wherein the first jaw mandible has a first length and the second jaw mandible has a second length longer than the first length.

18. The method of claim 15, wherein the oblique angle at which the interior tip edge of the second jaw tip is angled from the interior mandible edge of the second jaw mandible is about 70 degrees to about 85 degrees.

19. The method of claim 15, wherein the second jaw is a multipiece structure with the second jaw tip removably, pivotably, and/or slidably mounted to the second jaw mandible.

20. The method of claim 15, wherein the first jaw is a single piece structure with the first jaw tip projecting substantially orthogonally from the first jaw mandible.

* * * * *